Feb. 22, 1955  J. O. CREEK  2,702,495
MECHANISM FOR ROTATING WORKPIECES RELATIVE TO
MACHINE TOOLS, INCLUDING STRESS RELIEF MEANS
Filed Oct. 2, 1951  2 Sheets-Sheet 2
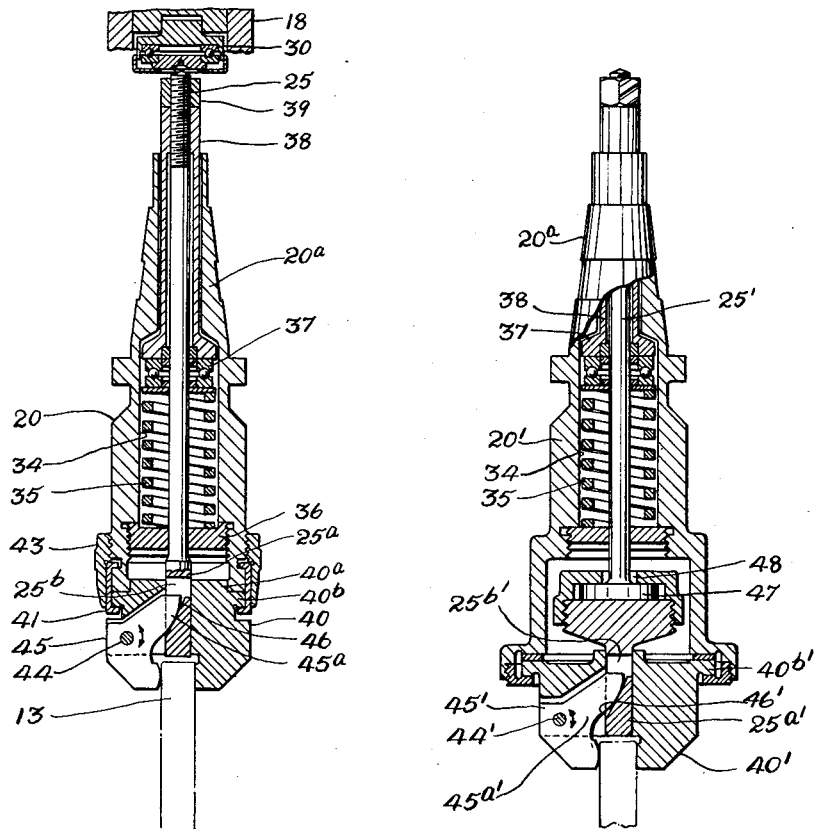
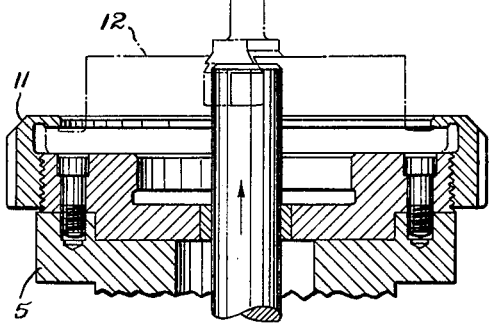
INVENTOR
J. O. CREEK
PER
ATTORNEY United States Patent Office 2,702,495
Patented Feb. 22, 1955

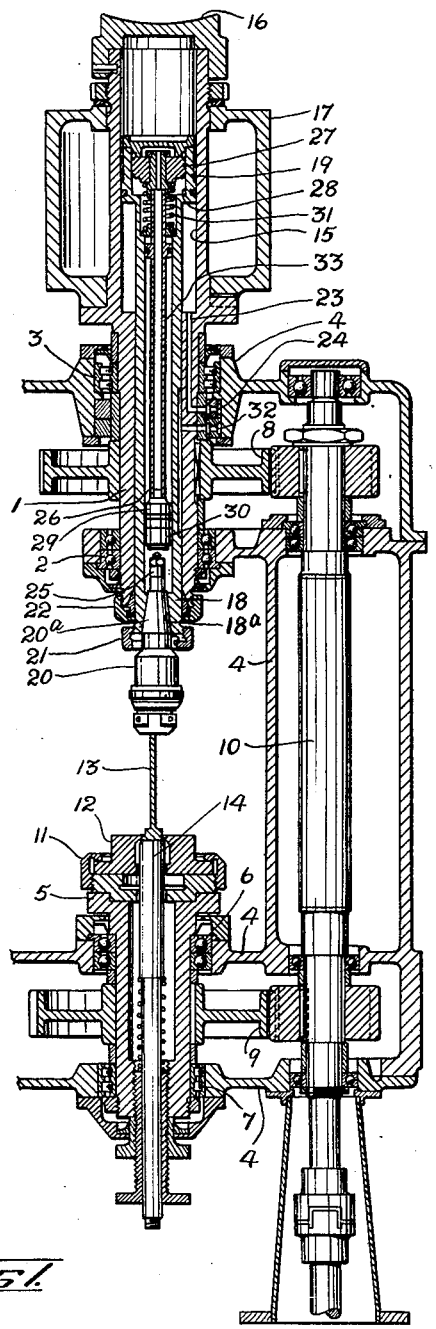

2,702,495

MECHANISM FOR ROTATING WORKPIECES RELATIVE TO MACHINE TOOLS, INCLUDING STRESS RELIEF MEANS

John Oliver Creek, Brampton, Ontario, Canada, assignor to A. V. Roe Canada Limited, Malton, Ontario, Canada, a corporation Application October 2, 1951, Serial No. 249,274

10 Claims. (Cl. 90—11)

The invention relates to stress release means for machine tools whereby stresses set up in a workpiece during machining operations can be released before making the final finishing cuts.

In a workpiece rigidly supported at more than one point, stresses are set up due to the removal of metal. If it is desired to machine finish the workpiece to a high degree of accuracy, it is necessary, before making the final finishing cuts, to release the clamps holding the workpiece to permit relative movement of the constituent fibres of the material, thereby releasing these stresses. The clamps are then re-engaged and the machining operation completed.

During the machining of a long slender workpiece, such as a blade of the turbine or compressor of a gas turbine engine, by rotation of the said workpiece relatively to a rotary cutter, for example a milling cutter or grinding or abrasive wheel, it is preferable to drive the long slender workpiece from both ends by gripping the said ends in a pair of chucks carried by two coaxial synchronously driven workspindles. Stresses, however, are set up in such a workpiece due to the removal of metal, and before making the final finishing cuts it would be advantageous to be able to free one end of the workpiece from the drive in such a manner that this end of the workpiece was free to twist or rotate relatively to the other end and thereby release such stresses. Before the completion of the machining operation, it would then be necessary to reconnect this end of the workpiece to the drive in the new position which it has assumed without forcing it back to its original position.

The main object of the present invention is, therefore, the provision of specific means whereby such a stress release can be effected in mechanism for the rotation of a workpiece relatively to a tool comprising a pair of coaxial synchronously driven workspindles carrying a pair of chucks adapted to grip opposite ends of the workpiece.

In the case of some workpieces, besides the above mentioned torsional stresses, serious lateral stresses also arise during the machining of the workpiece, and a further object of the invention is the provision of means for the release of such lateral stresses. In some cases, where it is previously known in which direction the end of the workpiece will move laterally when freed for stress release, it is sufficient to grip one end of the workpiece in a chuck possessing only two jaws with parallel faces, the end of the workpiece being clamped in the jaws in such a prearranged position relatively to the said jaws that, upon release of the jaws of the chuck for stress release, the end of the workpiece moves parallel to the faces of the jaws, and upon closure of the jaws the end of the workpiece is clamped in the new position it has assumed and not forced back to its original position. To meet the general case, however, in which it is not certain in which direction the end of the workpiece will move for stress release, means are provided in accordance with the invention to permit displacement as a unit of the jaws of one chuck normal to the axis of rotation of the workpiece.

The manner in which these objects have been attained will appear from the following description taken with the accompanying drawings, in which:

Fig. 1 is a side elevation partly broken away and shown in section, showing workpiece supporting and driving mechanism incorporating this invention;

Fig. 2 is a vertical section of the upper chuck shown in Fig. 1; and

Fig. 3 is a diagrammatic vertical section of a modified form of chuck.

The construction shown in the drawings illustrates means for supporting and rotating a relatively long slender workpiece, such as the blank of a compressor blade for a gas turbine engine, in a machine tool for milling or grinding such blanks.

By reference to Figure 1, it will be seen that an upper workspindle 1 is mounted for rotation in suitable bearings 2 and 3 supported by the frame 4 of the machine, and a lower workspindle 5 is mounted coaxially with the upper workspindle 1 in suitable bearings 6 and 7 also supported by the frame 4 of the machine. Keyed to the upper and lower work spindles 1 and 5 respectively are gears 8 and 9 driven from a common shaft 10, whereby the upper and lower workspindles 1 and 5 are adapted to be driven in synchronism.

The upper end of the lower workspindle 5 is provided with a screw-threaded ring 11 adapted to secure a chuck 12 to the workspindle 5, for clamping the lower end of the blank to be machined. An axially slidable plunger 14 is mounted within the lower workspindle 5 for actuation of the chuck jaws.

The upper workspindle 1 is a sleeve, the bore of which is enlarged at the upper end to form a cylinder 15. This upper end of the workspindle 1 is also adapted to have interchangeably mounted thereon a pattern 16 and a cam 17 for control of the position of the rotary cutter (not shown) during the machining operation.

Axially slidably mounted within the workspindle 1 is a chuck-carrying sleeve 18, having an upper end of enlarged diameter forming a piston 19 adapted to operate in the cylinder 15. The lower end of the sleeve 18 has a tapered bore 18$^a$ into which a correspondingly tapered end 20$^a$ of an upper chuck 20 is adapted to fit. The chuck 20 is retained in position in the end of the sleeve 18 by means of a screw-threaded clamping ring 21 bearing against two diametrically opposite lugs formed on the chuck body. The sleeve 18 is also adapted to be locked in position with respect to the workspindle 1 by means of a concentric tapered sleeve and coacting screw-threaded clamping ring 22. After release of this locking means, the sleeve 18 is displaceable with respect to the workspindle 1, to adjust the distance between the upper and lower chucks to suit blanks of different lengths, by means of fluid, such as air, under pressure introduced into the cylinder 15 by way of a port 23 connected by means of transverse ports, an annular groove machined in the surface of the workspindle 1, an annular gland 24, and a control valve (not shown).

The above-mentioned upper chuck 20 incorporates means to permit release of the stresses set up in the blank, these means being actuated by depression of a drawbar 25, see particularly Figure 2, protruding from the top of the said upper chuck 20. For depression of the drawbar 25, a tubular piston rod 26 is slidably mounted within the sleeve 18. At the upper end thereof the said piston rod 26 carries a piston 27 adapted to operate in a cylinder 28 formed inside the piston 19, whilst the lower end of the said tubular piston rod 26 has a plug 29 mounted therein, the said plug 29 carrying a thrust bearing 30 adapted to bear on the end of the drawbar 25. The piston rod 26 is retained in the normal upper inoperative position thereof by means of a helical compression spring 31 bearing at one end on the underside of the piston 27 and at the other end on a shoulder formed in the bore of the sleeve 18.

The piston 27 is adapted to be forced down, to cause actuation of the drawbar 25, by fluid under pressure introduced into the top of the cylinder 28 by way of a second annular gland 32, transverse ports, including the port 33 in the tubular piston rod 26, and an axial bore formed through the crown of the piston.

By reference now to Figure 2, it will be seen that the upper chuck 20, comprises a main tubular body having a tapered end portion 20$^a$ which, as previously mentioned, fits into a corresponding tapered bore 18$^a$ in the lower end of the sleeve 18. The said main body of the chuck 20 has a cylindrical bore 34 in which is mounted a helical compression spring 35. The lower end of the bore 34 is closed by a screw-threaded cap 36 and one end of the spring 35 bears on the said cap 36. The other end of the spring 35 bears, through the intermediary of a thrust bearing 37, on the head of a pressure-adjusting sleeve 38, the shank of which slides in another bore in the upper part 20ᵃ of the chuck 20. The previously-mentioned drawbar 25 extends through an axial bore in the sleeve 38 and also an axial bore in the cap 36. The bore in the sleeve 38 is of somewhat larger diameter than the diameter of the generally cylindrical drawbar 25, except for a portion at the upper end which is tapped with a screw thread corresponding to that formed on the upper end of the drawbar 25. The upper end of the sleeve 38 is also advantageously formed externally like a standard hexagon nut to permit the sleeve 38 to be screwed on the thread of the drawbar 25 to vary the pressure exerted by the spring 35 which, as will be hereinafter described, is the force causing the chuck jaws to grip the workpiece. A locknut 39 is provided to maintain the adjustment of the sleeve 38.

The chuck jaws consist of a solid jaw 40, which is of general cylindrical form and has a spigot 40ᵃ fitting closely into the end of the bore 34 and also a shoulder 40ᵇ adapted to bear against the end face of the body of the chuck 20. The engaging surfaces of the shoulder 40ᵇ and the end face of the body of the chuck form in effect friction disks of a clutch in which the body of the chuck is the clutch spindle, the spring 35 is the clutch spring and the drawbar 25 is the actuating rod. The clutch so formed provides a releasable drive for the solid jaw 40 by the body of the chuck 20.

The solid jaw 40 is held in position by a split retainer ring 41 and a ring nut 43. The lower end 25ᵃ of the drawbar 25 is of rectangular section. This rectangular lower end of the drawbar 25 is adapted to slide in a corresponding rectangular slot formed in the solid jaw 40. Pivotally mounted by means of a pin 44 in a recess formed in the solid jaw 40, is a movable jaw 45 which has an arm 45ᵃ extending into a slot 25ᵇ formed in the lower rectangular end of the drawbar 25. The lower end of the slot 25ᵇ terminates in a diagonal cam surface 46 adapted to bear against one side of the said arm 45ᵃ. As is shown in Figure 2, the upward thrust of the spring 35 tending to move the drawbar 25 upwards, causes, by means of the said cam surface, the movable jaw 45 to rotate about its pivot pin 44 and thus grip the tip of the blade blank 13 positioned between it and the solid jaw 40.

When the tip of the blade blank has been gripped between the jaws 40 and 45, the continued up thrust of the spring 35 acting through the drawbar 25 and the movable jaw 45, forces the solid jaw 40 upwards, whereby the engaging surfaces of the clutch are pressed together. Rotation of the upper workspindle 1 is, therefore, conveyed by way of the sleeve 18 and the chuck 20 to the jaws 40 and 45.

In operation, during the machining of a workpiece mounted in the upper and lower chucks and rotated thereby, when it is desired to release any stresses which may have been set up in the workpiece by the removal of metal therefrom, a control is operated, either manually or automatically during a return or non-cutting stroke of the cutter, to cause air or fluid under pressure to be admitted to the top of the cylinder 28. As previously described, this causes movement of the piston 27 to depress the drawbar 25, whereby the gripping action of the chuck jaw is released, and also the pressure between the surfaces of the clutch. The upper end of the blank or workpiece is thereby freed to permit movement thereof to release torsional stresses which have been set up in the blank. The control causing the supply of fluid under pressure to the cylinder 28 is then again operated to permit the piston 27 to return to its original upper position under the influence of the spring 31. The spring 35 of the chuck 20 thereupon causes a corresponding return movement of the drawbar 25, whereby the tip of the blank is again gripped by the chuck jaws in whatever new position it has assumed, the solid jaw 40 rotating if necessary relatively to the body of the chuck 20 for this purpose.

The above described construction is particularly adapted to machine the blanks of the blades of compressors or turbines for gas turbines, and in this construction the main rotational drive for the blank is effected by the lower chuck, the upper chuck serving mainly to steady the blank. However, it will be realized that the design of the clutch engaging surfaces can readily be changed, if desired, to increase or decrease the driving effect of the upper chuck. The chuck described is adapted to grip the rectangular end of a turbine blade but by providing a plurality of movable jaws the chuck may be adapted for gripping workpieces of other sections.

A modified form of chuck is illustrated in Figure 3, in which the construction is similar to that shown in Fig. 2. However, the drawbar 25' is provided with a universal joint adjacent its lower end formed by a cylindrical head 47 loosely retained in a recess 48. Below the joint the end 25ᵃ′ of the bar is rectangular in cross section and slides in a rectangular hole in the solid jaw 40'. The solid jaw 40' has a shoulder 40ᵇ′ which frictionally bears against the end face of the body of the chuck 20' to form a friction clutch. Movable jaw 45' pivoted in solid jaw 40' by pin 44' has an arm 45ᵃ′ which extends into slots 25ᵇ′ in the rectangular lower end of drawbar 25' and is adapted to engage diagonal face 46'.

The operation of this modified chuck is the same as that of the chuck shown in Fig. 2, except that the joint permits the jaws to float freely in all lateral directions, thus releasing lateral stresses as well as torsional stresses when desired.

It is to be understood that the terms "upper" and "lower" are used in this specification merely for convenience, and that the axis of rotation of the workspindles in the embodiment of the invention illustrated in the drawings need not be vertical.

What I claim as my invention is:

1. Mechanism for the rotation of a workpiece relative to a tool, comprising oppositely disposed means for clamping opposite ends of a workpiece; a pair of coaxial workspindles each of which has a driving connection with one of the workpiece clamping means; means for synchronously rotating the workspindles; fluid operated means to selectively close and open one of the workpiece clamping means and engage and disengage said clamping means from the driving connection during rotation of the workspindles to relieve stress on the workpiece; and means for supplying fluid to the fluid operated means during rotation of the workspindles.

2. Mechanism for the rotation of a workpiece relative to a tool, comprising oppositely disposed means for clamping opposite ends of a workpiece; a pair of coaxial workspindles each of which has a driving connection with one of the workpiece clamping means; means for synchronously rotating the workspindles; means to selectively close and open one of the workpiece clamping means during rotation of the workspindles; a clutch in the driving connection between the workspindle and said clamping means; and means for engaging and disengaging said clutch when the clamping means is closed and opened respectively, to relieve stress on the workpiece.

3. Mechanism for the rotation of a workpiece, relative to a tool, comprising oppositely disposed clamping members for clamping opposite ends of a workpiece; a pair of coaxial workspindles each of which has a driving connection with a clamping member; means for synchronously rotating the workspindles; a clutch in the driving connection between one of the workspindles and its clamping member; a clutch actuating rod for engaging and disengaging said clutch; means actuated by said clutch actuating rod to close and open said clamping member during rotation of the workspindles; spring means normally urging the clutch actuating rod to engage the clutch and close the clamping member; and means for actuating the clutch actuating rod to disengage the clutch and open the clamping member to relieve stress on the workpiece.

4. Mechanism for the rotation of a workpiece, relative to a tool, comprising oppositely disposed clamping members including jaws for clamping opposite ends of a workpiece; a pair of coaxial workspindles each of which has a driving connection with a clamping member; means for synchronously rotating the workspindles; a clutch in the driving connection between one of the workspindles and its clamping member; a clutch actuating rod slidably mounted coaxially of the workspindle for engaging and disengaging said clutch; means actuated by said actuating rod to close and open the jaws of said clamping member; spring means normally urging the clutch actuating rod to engage the clutch and close the jaws; a piston arranged coaxially of the workspindle; and means for reciprocating the piston during rotation of the workspindle to actuate the clutch actuating rod against the urging of the spring means to disengage the clutch and open the jaws.

5. Mechanism for the rotation of a workpiece, relative to a tool comprising oppositely disposed clamping members for clamping opposite ends of a workpiece; a pair of coaxial workspindles each of which has a driving connection with a clamping member; means for synchronously rotating the workspindles; a clutch in the driving connection between one of the workspindles and its clamping member; a clutch actuating rod for engaging and disengaging said clutch; means actuated by said clutch actuating rod to close and open the clamping member during rotation of the workspindles; spring means normally urging the clutch actuating rod to engage the clutch and close the clamping member; means for actuating the clutch actuating rod to disengage the clutch and open the clamping member to relieve stress on the workpiece; and a universal joint in the clutch actuating rod to permit lateral displacement of the clamping member.

6. Mechanism for the rotation of a workpiece relative to a tool, comprising oppositely disposed means for clamping opposite ends of a workpiece; a pair of coaxial workspindles each of which has a driving connection with one of the workpiece clamping means; means for synchronously rotating the workspindles; means to selectively close and open one of the workpiece clamping means during rotation of the workspindles; a clutch in the driving connection between the workspindle and said one of the clamping means; and means for engaging and disengaging said clutch when said one of the clamping means is closed and opened respectively, the last mentioned means including a universal joint to permit lateral displacement of said one of the clamping means.

7. Mechanism for the rotation of a workpiece relative to a tool, comprising oppositely disposed means for clamping opposite ends of a workpiece; a pair of coaxial workspindles each of which has a driving connection with one of the workpiece clamping means; means for synchronously rotating the workspindles; one of the driving connections including interengaging clutch faces on a workspindle and clamping means respectively, said clamping means being rotatably mounted on said workspindle and including jaws, one of which is pivoted with respect to the other and is provided with a lever arm, said jaws being adapted to close and open to grip and release a workpiece; means normally urging the clutch faces into engagement; and a clutch spindle mounted coaxially of said workspindle and slidable during rotation of the workspindles to disengage said clutch faces, the lever arm of said jaw being engageable by the clutch spindle to open the jaws when the clutch is moved to disengage the clutch faces.

8. Mechanism as claimed in claim 7, in which the clutch spindle has a cam surface for said engagement with the lever arm of the pivoted jaw.

9. The method of machining and relieving stresses in a workpiece which comprises rigidly clamping the workpiece at opposite ends thereof, rotatably driving the workpiece from both rigidly clamped ends, machining the workpiece while maintaining the rigid clamping of both ends and the rotatable driving from both ends, freeing one end while maintaining the rigid clamping of the other end and the rotatable driving from said clamped other end, the freeing of the one end permitting the workpiece to deform and the freed end to be displaced as a result of stresses set up in the workpiece during the machining operation, said stresses being relieved without stopping the rotation of the workpiece, then re-clamping the freed end in its displaced position while maintaining the rigid clamping of said other end and the rotatable driving from said clamping other end, and continuing the rotatable driving by rotatably driving the workpiece from both said clamped other end and said re-clamped end for further machining.

10. The method of machining and relieving stresses in a workpiece which comprises rigidly clamping opposite ends of the workpiece in oppositely disposed clamping means, rotatably driving the clamping means synchronously about a common axis from workspindles having driving connections with the clamping means, thus rotatably driving the workpiece from both rigidly clamped ends, machining the workpiece while maintaining the rigid clamping of both ends and the rotatable driving from both ends, opening one of said clamping means, thus freeing one end of the workpiece, and disengaging said one of the clamping means from its driving connection with its workspindle, all the while maintaining the rigid clamping of the other end and the rotatable driving from said clamped other end, the freeing of the one end permitting the workpiece to deform and the freed end to be displaced as a result of stresses set up in the workpiece during the machining operation, said stresses being relieved without stopping the rotation of the workpiece, then re-closing said one of the clamping means upon said one end in its displaced position and re-engaging said one of the clamping means in its driving connection with its workspindle all the while maintaining the rigid clamping of said other end and the rotatable driving from said clamped other end, and maintaining the rotatable driving by rotatably driving the workpiece from both said clamped other end and said re-clamped end for further machining.

References Cited in the file of this patent

UNITED STATES PATENTS

| | | |
|---|---|---|
| 1,085,146 | McClellan | Jan. 27, 1914 |
| 1,914,984 | Smith | June 20, 1933 |
| 1,938,409 | Tomkins | Dec. 5, 1933 |
| 2,102,505 | Berthiez | Dec. 14, 1937 |

FOREIGN PATENTS

| | | |
|---|---|---|
| 479,076 | Great Britain | of 1938 |